(12) United States Patent
Jeon et al.

(10) Patent No.: US 7,879,449 B2
(45) Date of Patent: Feb. 1, 2011

(54) NON-STICK CERAMIC COATING COMPOSITION AND PROCESS

(75) Inventors: Bong Yeol Jeon, 3-24, Juan-Dong, Nam-Gu, Incheon (KR); Sang Mok Kim, 3-24, Juan-Dong, Nam-Gu, Incheon (KR)

(73) Assignees: Cerasol Hong Kong Ltd., Hong Kong (CN); Bong Yeol Jeon, Incheon (KR); Sang Mok Kim, Incheon (KR)

( * ) Notice: Subject to any disclaimer, the term of this patent is extended or adjusted under 35 U.S.C. 154(b) by 1165 days.

(21) Appl. No.: 11/457,503

(22) Filed: Jul. 14, 2006

(65) Prior Publication Data

US 2007/0218297 A1 Sep. 20, 2007

Related U.S. Application Data

(60) Provisional application No. 60/782,015, filed on Mar. 14, 2006, provisional application No. 60/793,504, filed on Apr. 20, 2006.

(51) Int. Cl.
*B32B 9/04* (2006.01)

(52) U.S. Cl. .................. 428/447; 428/331; 428/448; 428/451

(58) Field of Classification Search .............. 428/331, 428/447, 448, 450, 451
See application file for complete search history.

(56) References Cited

U.S. PATENT DOCUMENTS

| 4,275,118 A | 6/1981 | Baney et al. |
| 4,683,168 A | 7/1987 | Hares et al. |
| 6,054,522 A | 4/2000 | Carre et al. |
| 2001/0053445 A1* | 12/2001 | Kang et al. ................. 428/421 |

* cited by examiner

*Primary Examiner*—D. S Nakarani
(74) *Attorney, Agent, or Firm*—Martin Fleit; Paul D. Bianco; Fleit Gibbons Gutman Bongini & Bianco, PL

(57) ABSTRACT

A series of new non-stick ceramic coating materials prepared from organic-inorganic hybrid materials, including silica sol, MTMS, FAS and PDMS (Polydimethylsiloxane) using the sol-gel process. The hybrid materials have good mechanical properties and are fashioned into a main ceramic network and good non-stick properties from organic non-stick compounds. The non-stick ceramic coating consists of two layers applied to cookware and for other applications.

5 Claims, 6 Drawing Sheets

# NON-STICK CERAMIC COATING COMPOSITION AND PROCESS

CROSS-REFERENCE TO RELATED APPLICATIONS

This application claims the benefit under 35 U.S.C. §119 (e) of Provisional Application No. 60/782,015 filed Mar. 14, 2006 and Provisional Application No. 60/793,504 filed Apr. 20, 2006. The content of each of these applications is incorporated by reference herein.

BACKGROUND OF INVENTION

1. Field of the Invention

The present invention relates to non-stick ceramic coating compositions and methods for making same, and for coating utensils or cookware made of stainless steel, aluminum, aluminum alloy, cast iron or steel.

2. Prior Art

Considerable effort has been directed at producing an effective, non-stick and non-wetting coating on a substrate that constitutes the surface of cookware for preparing food. The term "non-stick" signifies a surface that resists adherence of substances, such as oils, greases, or other food items. This property permits easy cleaning of dishes in which foods are prepared by heating. The term "non-wetting" indicates a surface that repels liquids such as water. The property is evidenced by a large contact angle between a drop of water and the surface on which the drop rests. An advancing angle of at least 90.degree, is considered as representative of a non-wettable surface.

Non-stick, non-wetting articles are commonly produced by coating article surfaces with a polytetrafluoroethylene (PTFE) layer. For example, U.S. Pat. No. 4,683,168 (Hares et al.) describes a process for coating glass or glass-ceramic articles with such a layer to produce non-stick cooking utensils. However, PTFE coatings exhibit the disadvantage of being opaque. Also, they require a thermal sintering process at 350.degree.-400.degree. C. for their production, are relatively expensive to produce, and do not provide a desired degree of abrasion resistance.

U.S. Pat. No. 4,275,118 to Baney et al. describes a coating composition comprising an acidic dispersion of colloidal silica in an alcohol-water medium which produces a hard, abrasion-resistant coating.

U.S. Pat. No. 6,054,522 to Alain et al. discloses a protective coating which imparts non-stick, abrasion and hydrophobic properties with an inorganic network from metal alkoxides and an organic network from silanes via a sol-gel process. But this coating is very thin, which is not good as a protective coating, and also, has no color. These PTFE coatings have a finite life due to their organic makeup. Over time, these coatings dry out and lose their lubricity.

Various processes and materials have been proposed to create a non-stick coating. However, a problem persists regarding wear during use, in particular, scratching by cleaning agents.

SUMMARY OF THE INVENTION

It is, therefore, a principal object of the present invention to provide a novel coating composition, method of making same and method of applying that will result in a greater abrasion resistance, increased surface hardness, and longer wear.

Other and further object of the present invention will become apparent from the following detailed description of the invention when taken in conjunction with the appended drawings.

DETAILED DESCRIPTION OF PREFERRED EMBODIMENTS OF THE INVENTION

Figure 1:
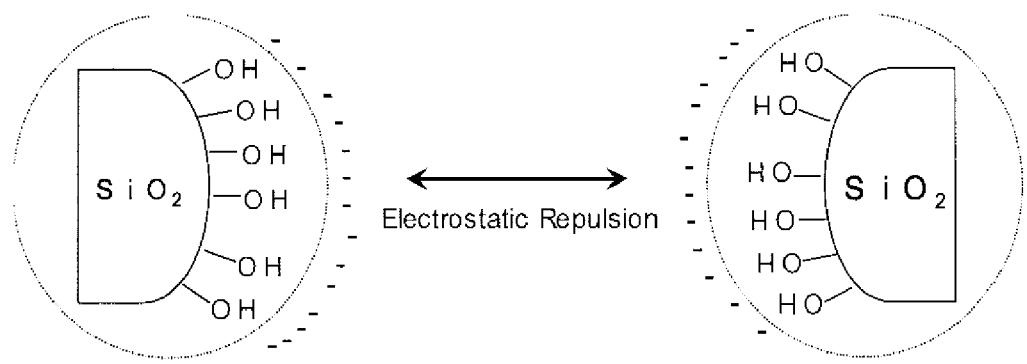
FIG. 1 is a diagram illustrating a stable state of silica sol particles showing how electrostatic repulsion occurs whereby the particles make a stable dispersion.

Referring now to the drawings, there will be described novel abrasion resistant and high hardness non-stick coatings primarily for cookware, although they have other industrial and commercial uses. The novel coating includes a $SiO_2$ ceramic matrix that includes the condensation product of hydrolyzed alkoxysilane and a colloidal silica sol. A series of new abrasion resistant and high hardness non-stick coating materials have been developed with ceramic matrix and organic compounds by sol-gel process.

This non-stick material has two main component of silicon dioxide. One is silica sol which is pure $SiO_2$, another is an organoalkoxysilane which is an organic-inorganic hybrid material. Both materials can make strong chemical bond from chemical reaction, condensation. $(OR')_{4-x}$ groups are hydrolyzed with water and then make condensation with silica sol and each other. The ceramic non-stick hybrid coating is applied by a sol-gel process. Two kinds of non-stick organic compounds make a chemical bond with silica ceramic network or matrix and it can exist in the ceramic structure in a stable state.

The main matrix is composed of a network of silica formed by the chemical reaction or condensation of colloidal silica sol (water base) and an organoalkoxysilane such as MTMS (methyltrimethoxysilane). The colloidal silica sol is a very stable state because of the electrostatic repulsion of silica particle surface. This is illustrated in FIG. 1 of the drawing. The organoalkoxysilane preferably has the general formula

Figure 2:
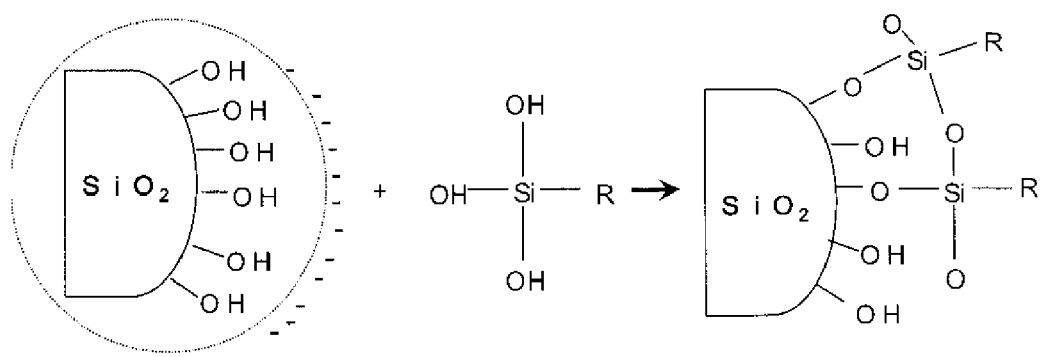
FIG. 2 is a diagram illustrating the condensation mechanism of organoalkoxysilane with a colloidal silica sol.

Wherein R is one or more organic radicals chosen independently from among methyl, ethyl, and propyl, R' is a low molecular weight alkyl radical, and x is at least one and less than four. Commonly x is one, so that the organoalkoxysilane has three hydrolysable sites. This increases cohesion and bonding of the components and also provides a thickened layer and increases the links with the inorganic silica surface. These sites are hydrolyzed by the water that is in silica sol with an acidic catalyst. The colloidal silica sol is acidified with a mineral or organic acid to reduce the pH below approximately 4. FIG. 2 shows the condensation reaction between colloidal silica sol and hydrolyzed organoalkoxysilane. Examples of operable acids include hydrochloric acid, nitric acid, sulfuric acid, formic acid, propionic acid and acetic acid.

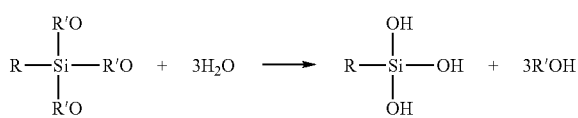

Hydrolyzed hydroxyl groups of organoalkoxysilane make a strong oxygen bond with each other and also can connect on the silica surface.

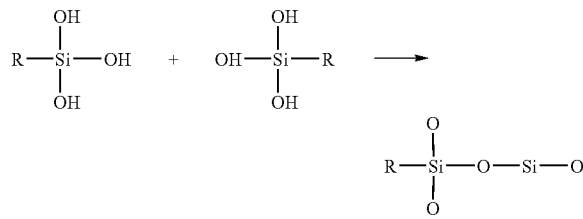

Adding the acidic catalyst puts the reacted solution in acidic state below pH 4. In this pH condition, colloidal silica sols can effect condensation with each other, but the existence of reacted organoalkoxysilanes on the sol surface can reduce the possibility of the sol condensation, which can increase the storage time of the solution. The weight proportion of organoalkoxysilane in the matrix composition to the silica sol can vary. For example, the organoalkoxysilane can be about from 5 wt % to 50 wt % of silica sol.

Alcoholic solvent is added in the mixture of silica sol and organoalkoxysilane, for example, methanol, ethanol, and propanol. Ethanol or propanol is preferred. The proportion of solvent to the mixture of organoalkoxysilane and silica sol is from 10 wt % to 50 wt %. This mixed material (matrix), organoalkoxysilane, silica sol and alcoholic solvent, is used as a binder which can maintain a stable state at least for three month.

Organoalkoxysilane, silica sol and alcohol can't make any structure of film per se, in other words, each material by itself cannot function as the binder. Some amount of silica sol and organoalkoxysilane are mixed and chemically react. In this reaction, alcohol solvent is necessary. Binder means the reacted material of silica sol and organoalkoxysilane in the alcoholic solvent base.

Figure 3:
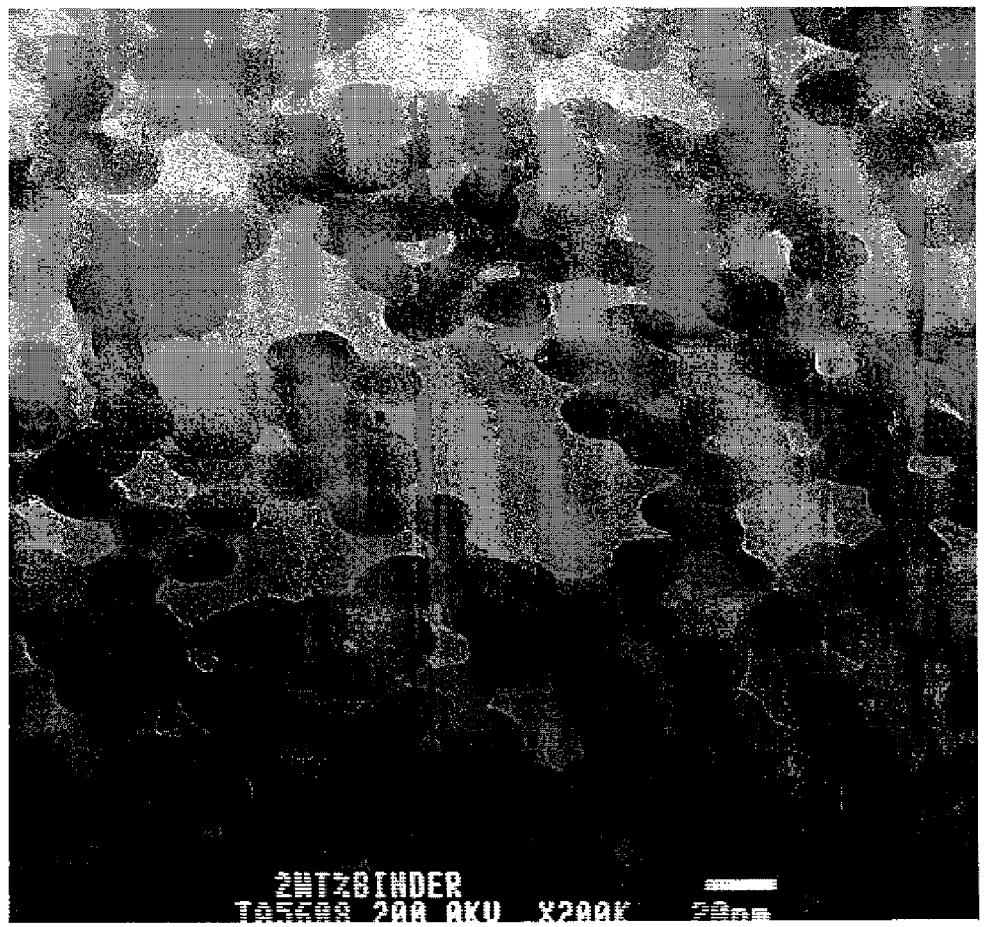
FIG. 3 is a TEM picture of a reacted first binder, consisting of an organoalkoxysilane condensed with colloidal silica sol.

The surface of colloidal silica is coated by organoalkoxysilanes, in other words, hydrolyzed organoalkoxysilane make a thin layer or coating on the silica surface as a result of the condensation reaction with the hydroxyl groups of the silica surface. FIG. 3 shows a TEM illustrating the structure of organoalkoxysilane coated silica sol whereby stable organoalkoxysilane layers are formed on the silica particles. The layer or coating can prevent the cohesion among the silica particles and also serves to bridge each particle with other organoalkoxysilanes.

Same or different organoalkoxysilanes, e.g., fluoroalkoxysilane (FAS) and PDMS (polydimethylsiloxane) are applied to the described matrix system. FAS (Fluoroalkoxysilane) and PDMS (polydimethylsiloxane) have good non-stick properties and also make a strong chemical bond with organoalkoxysilane. The chemical formula of both materials is as below, PDMS(polydimethylsiloxane) $HO[OSi(CH_3)_2]_xOH$ PDMS has similar a back bone structure to the main matrix of $SiO_2$ and it's terminal hydroxyl chains can react via condensation with hydrolyzed organoalkoxysilane and the silica surface. Because PDMS also has a good hydrophobic property, it can push out water from the matrix so that it can reduce the capillary stress and possibility of crack during drying procedure. Good thermal stability permits PDMS to use high temperature application with ceramic matrix.

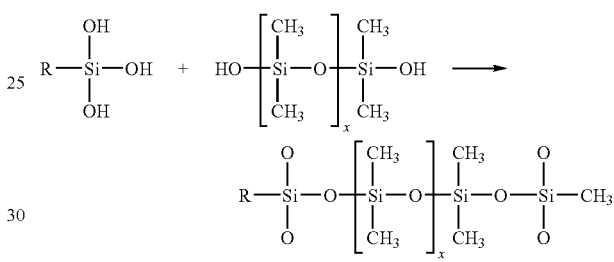

The molecular weight of PDMS is varies from 400 to 6000. The number of CH3-Si-CH3 monomers in the chain determines the PDMS molecular weight and this chain helps the structure to have good non-stick properties. PDMS can make a strong chemical bond with silica sol surface and added organoalkoxysilane.

PDMS can make the chemical bond with the silica sol and the silane network, but there is some limitation for substitution.

In the method of the invention silanes are added twice. In a first step or stage, silanes are added with only catalyst, but in the second step, silanes are added with catalyst and additives. In this second step, the invention uses PDMS and FAS for their non-stick properties. Additives and some amount of silane can be substituted.

The invention employs a two layer coating system, a base layer and a top layer. In the base layer only PDMS is used as a non-stick additive, the substituted amount is from 5 to 20 weight %. In the top layer PDMS and FAS are used as the non-stick additives. 5-20 weight % of silanes are substituted with PDMS and 0.5~12 wt % of silanes are substituted with FAS.

Epoxy silane having epoxy groups that have good adhesion properties with metal substrate can be added. Also these groups can increase the flexibility of the matrix structure. Some amount of MTMS silane can be substituted with Epoxy silane. In the base layer 5~50 wt % of silanes can be substituted with epoxy silane at the first step. 5~30 wt % can be substituted at the second step.

FAS is the silane having the formula $RxSi(OR')4-x$, R is chosen independently and partially or totally substitute by fluorine atoms. Alkoxy(OR') chains of FAS are hydrolyzed and react via condensation with the silica sol surface and organoalkoxysilane matrix.

FAS(Fluoroalkoxysilane) CF$_3$(CF$_2$)$_n$(CH$_2$)$_m$Si(OR')

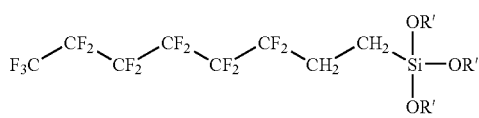

The fluoro chain of FAS increases the non-stick properties of the structure and the three alkoxy chains make a strong and stable oxygen bond with the ceramic network (matrix).

FAS and PDMS play an important role as hardeners with additional organoalkoxysilane in the first mixed solution. Alkoxy chains of the organoalkoxysilane, FAS and PDMS, are hydrolyzed and react via condensation with the hydroxyl groups of silica sol and previously added organoalkoxysilane.

All kinds of material can be a substrate, for example, all kinds of metal, plastic, stone, glass and so on. But all substrates must be prepared by a sand blasting procedure, as will be described. Especially metal has a low surface hardness and strength, because of this disadvantage, ceramic coatings on metal substrate are very efficient. Aluminum is the most popular metal element for a substrate and it has good adhesion properties with the novel ceramic coating of the present invention.

Figure 4:
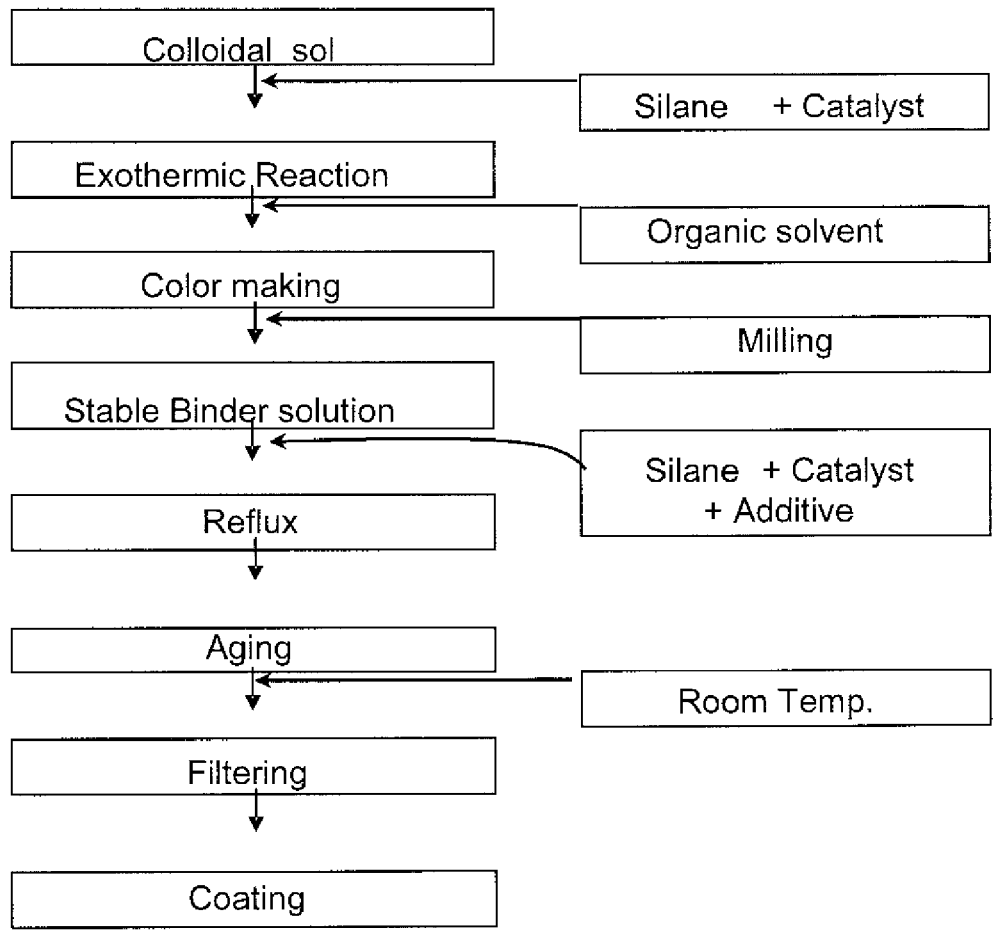
FIG. 4 is a block diagram showing the novel method for making a coating solution according to the present invention.

FIG. 4 shows a block diagram setting out the chemical reaction procedure of the non-stick ceramic coating solution. Shown are the method steps for making the composition of the invention, i.e., the procedure of the reaction from the raw materials. As shown in this block diagram, silane is added twice at different stages. As shown in FIG. 4, first the silica sol is made, then silane and catalyst are added and the exothermic reaction takes place. Then the organic solvent is added and the color is added in color making. Then milling takes place and a stable binder solution results. Next silane and catalyst are added and reflux takes place. The binder is aged and then brought to room temperature and filtering takes place. Finally the composition is ready and coating takes place.

In one form of the invention, the compositions are prepared in kit form. Actually, this product is produced as two types of solutions, A solution and B solution. In other words, this non-stick ceramic solution can be sold in a kit form with 2 bottles. At first, the A solution is made, which has the color of the coating, and then, B solution is made, which is transparent. Solutions A and B are wrapped separately in bottles or any suitable containers. The final customer must mix the A and B solutions, must do the last reflux procedure. At the first stage for making A solution, no non-stick additives are used. The proportions of sol and silane are shown the following table. For the second stage, making the B solution, FAS and PDMS are used with silane as shown the table.

Figure 5:
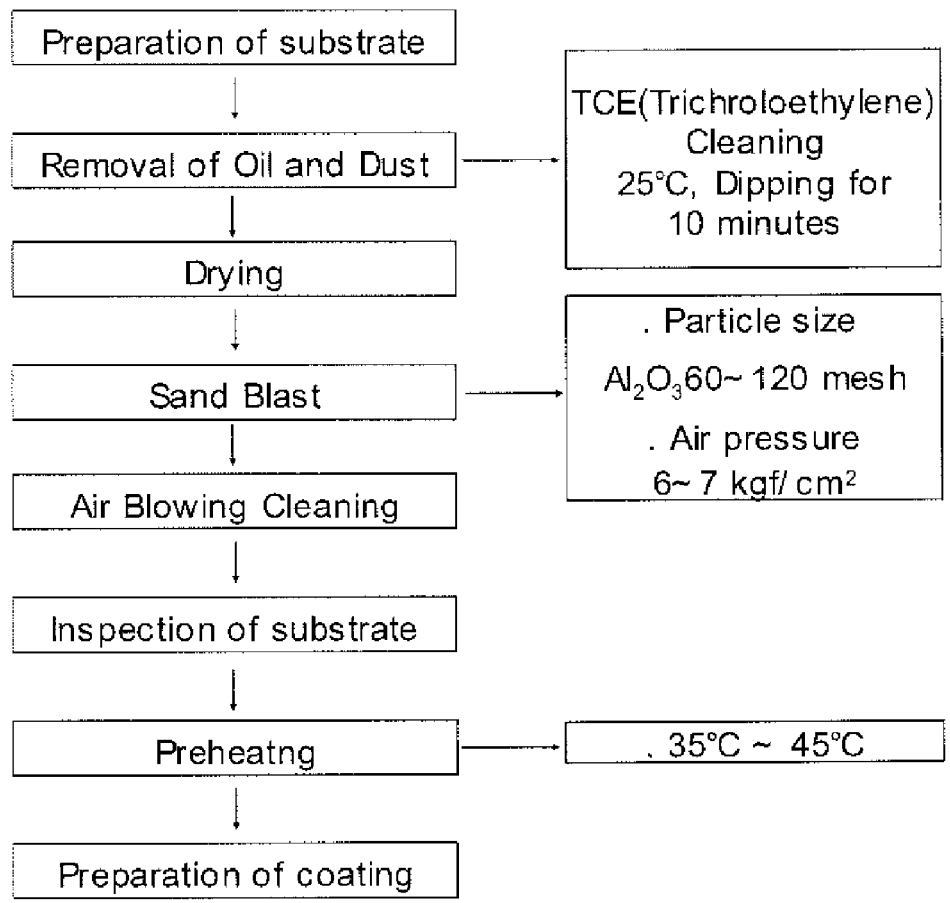
FIG. 5 is a block diagram showing the method of pretreatment of a substrate surface.

The coating solution is applied to the surface of a suitable substrate to make a non-stick property on the surface of substrate. To make good adhesion and homogeneous surface particular pretreatment must be done. FIG. 5 shows in block diagram the surface pretreatment of the substrate. The first step is to prepare the substrate. Next the oil and dust are removed from the substrate using TCE (trichloroethylene) cleaning by heating to 25° C. and dipping for 10 minutes. Next the substrate is dried and then sand blasted using Al$_2$O$_3$ of a particle size 60 to 120 mesh, using air pressure of 6-7 kgf/cm$^2$ in order to roughen the surface and increase its area substantially. Thereafter, the substrate is blown clean using suitable air pressure. The substrate is inspected and then preheated to 35° C. to 45° C. The surface of the substrate is now ready for coating. The amount of surface area and state of the surface area are most important variables for ceramic coating. High surface area gives a substrate enough surface energy to provide a high adhesion force. To make this high surface area the 60 to 120 mesh sand blast isy used after the surface has been freed of dust and oil. TCE (trichroloethylene) is used to degrease oil and dust on the substrate surface.

In the procedure block diagram there is an color making step. This step includes the "milling" step. Many kinds of inorganic pigment are used for the color. 60 wt %-80 wt % of stable binder is mixed with colored inorganic pigment (15 wt % 30 wt %) and filler (BaSO$_4$, mica and talc, etc). In the milling step, three types of mills can be used including ball mills, sand mills and ring mills. The color desired is obtained in the known way from the various kinds of pigments presently known and used in the art. After refluxing of silica sol and silane with organic solvent, a stable solution reaults, as previously described, which is called "binder".

In the procedure block diagram of FIG. 4, additives are mentioned as being added during the second addition of the silane and catalyst. The main additives are FAS and PDMS for the non-stick properties. However, special functional additives may be added per a customer's request. For example, if customer wants a negative ion emission effect, a substance can be added in order to produce the requested effect of making negative ions.

All the chemical reactions should be done in acidic condition, below pH 4.5 and greater than pH 2.0 and preferably at room temperature. For the acid catalyst commonly known organic and inorganic acid catalysts are used. Actually, most of the reaction is exothermic, so the solution temperature is nearly 60° C. To get the good adhesive force on the substrate, a preheating procedure is necessary, for example, 35° C.~45° C. preheating temperature will result in a good adhesion property and also, increase the coating thickness of the ceramic coating on, for example, an aluminum substrate.

|  | Silica sol | MTMS | Catalyst | Solvent |
|---|---|---|---|---|
| Proportion of A solution | 30 wt %~70 wt % | 2 wt %~40 wt % | 0 wt %~2 wt % | 10 wt %~40 wt % |

|  | MTMS | FAS | PDMS | Catalyst |
|---|---|---|---|---|
| Proportion of B solution | 75 wt %~99 wt % | 0.3 wt %~2 wt % | 5 wt %~20 wt % | 0 wt %~3 wt % |

The techniques for forming the non-stick ceramic coating include painting, spinning, dipping and spraying. The most efficient technique is spray coating. The solution is then heated at 120° C.~300° C. for 10~30 minutes to remove water and organic solvent and to increase the density of the inorganic structure. The final coated product must be cooled at room temperature in the air.

Figure 6A:
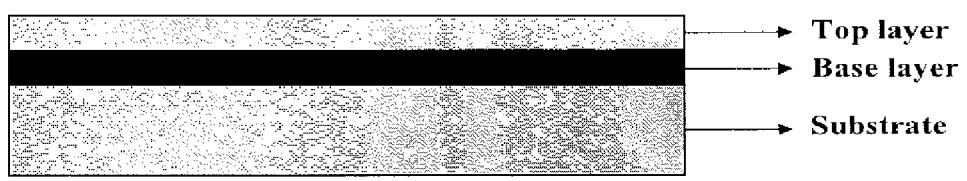
FIG. 6a is vertical section of a non-stick ceramic coating comprised of two layers in accordance with the present invention.
Figure 6B:
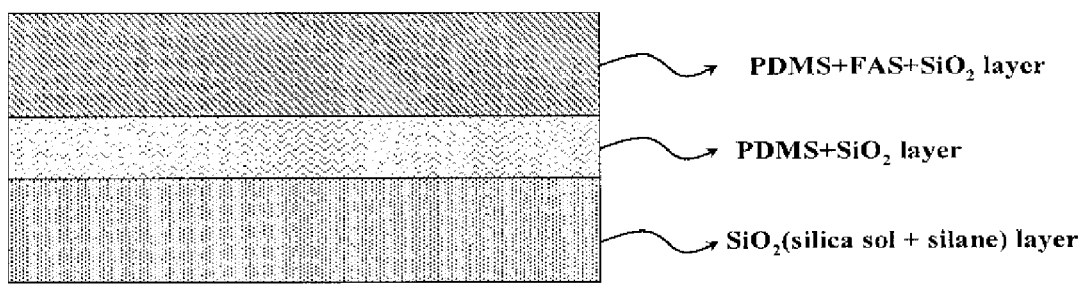
FIG. 6b is vertical section of the non-stick ceramic coating shown in FIG. 6a showing in more detail the composition and arrangement of the two layers in accordance with the present invention.

To obtain a good non-stick coating which has a sufficient mechanical property, two layers coating should be carried out. FIG. 6a shows the structure of these two layers, identified as a top layer and a base layer directly contacting the substrate. As shown in FIG. 6b, the base layer is composed principally of the silica and organoalkoxysilane hybrid network or matrix. As previously described, some PDMS is substituted for some silane in the base layer. As the PDMS has a lower specific gravity than the matrix solution, the PDMS will rise to the top of the base layer and float at the top so that the base layer becomes a distinct lower portion consisting of $SiO_2$ (silica sol and silane) and distinct upper portion consisting of PDMS and $SiO_2$ (silica sol and silane) at the top of the base layer. Some amount of organoalkoxysilane in the base layer can be substituted to increase the adhesion power with substrate, for example, epoxy silane can be substituted to increase the adhesion property for an aluminum substrate, in which case the epoxy silane will be present in the lower portion of the base layer. The lower portion of the base layer contains silica sol and organoalkoxysilane, in order to make a good adhesion with the substrate, whereas the upper portion of the base layer contains PDMS, in order to make a contribution to the non-stick function of the structure. The base layer can be a colored layer as previously described.

The top layer is a transparent film which has both non-stick materials in the structure and also provides a very hard surface. PDMS make a two oxygen bridge with the main matrix and PDMS can give flexibility of the ceramic matrix. FAS can make three oxygen bridges with main matrix, so it can make the structure of the top layer harder than the base layer. The color pigments present in the base layer tend to have a large particle size. Accordingly, keeping the top layer transparent enables the top layer to have much better mechanical properties than the colored base layer. This top layer is characterized by excellent non-stick performance and mechanical properties, and overcomes the disadvantages of prior art non-stick coatings.

The top layer is coated on the base layer in the wet state, just after coating the base layer onto the substrate. This enables some of the solutions of the top layer to diffuse and/or saturate into the upper portion of the solutions constituting the base layer and enhances the upper portion (PDMS+$SiO_2$) of the base layer. This diffusion and/or saturation give the structure's non-stick properties greater durability.

Figure 7A:
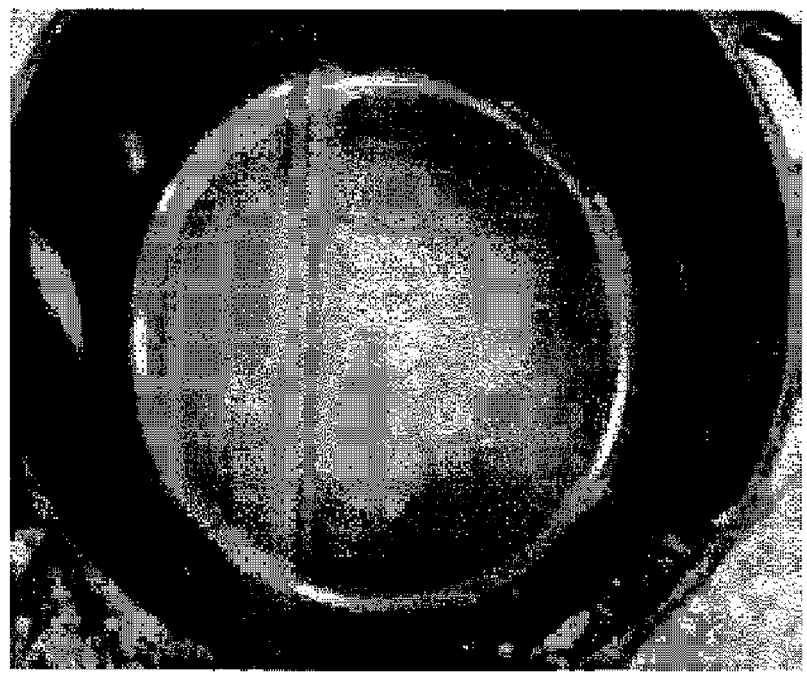
FIG. 7a is a picture of the test result of the mechanical property regarding abrasion resistance of the novel two layer non-stick ceramic coating of the invention.
Figure 7B:
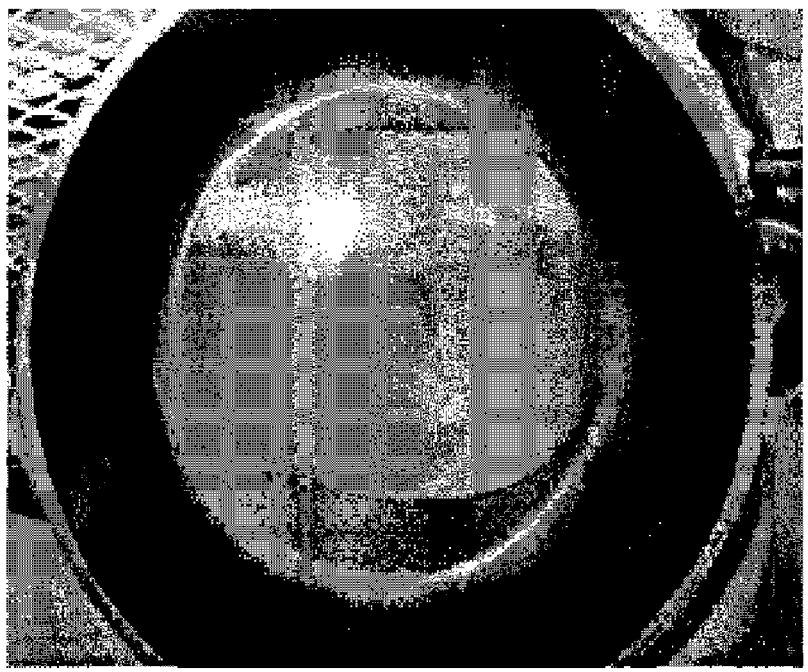
FIG. 7b is a picture of the test result of the mechanical property regarding scratch resistance of two layer non-stick ceramic coating of the invention.

FIGS. 7a and b show pictorially the abrasion and scratch test results, respectively. FIG. 7a is shows the result of a NORD test for abrasion with pancake. FIG. 7b shows the result of a MTP test for scratch resistance. Whereas a PTFE coating, according to the prior art only has a surface of 3H~4H pencil hardness, the ceramic non-stick coating of the present invention has a surface of more than 9H pencil hardness.

What is claimed is:

1. A non-stick coating composition comprising;
   a colored base layer for bonding to a substrate and a transparent top layer superimposed on and bonded to the base layer;
   the base layer composed of 70 to 85% by weight of a first matrix comprising the condensation reaction product of a silica sol and methyltrihydroxysilane and from 15 to 30% by wt of a colorant, with about 5 to about 20% by wt of the first matrix being substituted by hydroxy-terminated polydimethylsiloxane having a molecular weight of from about 400 to 6000; said base layer having a distinct lower portion composed principally of the first matrix and colorant, and a distinct upper portion composed principally of said hydroxy-terminated polydimethylsiloxane and said first matrix and colorant, and
   the top layer composed of a second matrix comprising the condensation reaction product of a silica sol and methyltrihydroxysilane with from about 5 to about 20% by wt of the second matrix being substituted by hydroxy-terminated polydimethylsiloxane having a molecular weight of from about 400 to 6000, and with from about 0.3 to about 12% by wt of the second matrix being substituted by fluoroalkoxysilane.

2. A non-stick coating composition according to claim 1 wherein the fluoroalkoxysilane is present less than about 2 wt % of the second matrix.

3. A non-stick coating composition according to claim 1 wherein the matrices are comprised of from 30 wt % to about 70 wt % of silica sol, and 2 wt % to 40 wt % of methyltrihydroxysilane.

4. A non-stick coating composition according to claim 1 wherein a catalyst is present in an amount up to about 2 wt % of the matrices.

5. The non-stick coating composition of claim 1 wherein from about 5 to 50% epoxy silane is substituted for the first matrix present in the base layer.

* * * * *